United States Patent
Tilton et al.

(10) Patent No.: US 10,496,156 B2
(45) Date of Patent: Dec. 3, 2019

(54) TECHNIQUES TO CHANGE LOCATION OF OBJECTS IN A VIRTUAL/AUGMENTED REALITY SYSTEM

(71) Applicant: GOOGLE INC., Mountain View, CA (US)

(72) Inventors: Robbie Tilton, San Francisco, CA (US); Robert Carl Jagnow, Mountain View, CA (US); Alexander James Faaborg, Mountain View, CA (US); Chris McKenzie, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/595,095

(22) Filed: May 15, 2017

(65) Prior Publication Data

US 2017/0336863 A1    Nov. 23, 2017

Related U.S. Application Data

(60) Provisional application No. 62/337,628, filed on May 17, 2016.

(51) Int. Cl.
*G06F 3/01* (2006.01)
*G06T 3/20* (2006.01)
(Continued)

(52) U.S. Cl.
CPC .............. *G06F 3/012* (2013.01); *A63F 13/00* (2013.01); *A63F 13/5372* (2014.09);
(Continued)

(58) Field of Classification Search
None
See application file for complete search history.

(56) References Cited

U.S. PATENT DOCUMENTS

| | | | |
|---|---|---|---|
| 2004/0189512 A1* | 9/2004 | Takashima | G01S 13/931 342/70 |
| 2014/0192087 A1* | 7/2014 | Frost | G06F 3/011 345/633 |

(Continued)

FOREIGN PATENT DOCUMENTS

GB    2524269 A    9/2015

OTHER PUBLICATIONS

Invitation to Pay Additional Fees and Partial Search Report Received for PCT/US2017/032849, dated Oct. 23, 2017, 12 pages.

(Continued)

*Primary Examiner* — Jeffrey J Chow
(74) *Attorney, Agent, or Firm* — Brake Hughes Bellermann LLP

(57) ABSTRACT

A system and method of operating an audio visual system generating an immersive virtual experience may include generating, by a head-mounted audio visual device, a virtual world immersive experience within a virtual space while physically moving within a physical space, displaying, by the head-mounted audio visual device within the virtual space, a visual target marker indicating a target location in the physical space, receiving, by the head-mounted audio visual device, a teleport control signal, and moving a virtual location of the head-mounted audio visual device within the virtual space from a first virtual location to a second virtual location in response to receiving the teleport control signal.

20 Claims, 12 Drawing Sheets

(51) Int. Cl.
  *G06T 11/60* (2006.01)
  *A63F 13/00* (2014.01)
  *G06F 3/0481* (2013.01)
  *G02B 27/01* (2006.01)
  *A63F 13/5372* (2014.01)
  *A63F 13/57* (2014.01)

(52) U.S. Cl.
  CPC ............ *A63F 13/57* (2014.09); *G02B 27/017* (2013.01); *G06F 3/011* (2013.01); *G06F 3/04815* (2013.01); *G06T 3/20* (2013.01); *G06T 11/60* (2013.01); *A63F 2300/64* (2013.01); *A63F 2300/8082* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 2015/0040073 A1* | 2/2015 | Barcay | G06F 3/04815 715/850 |
| 2015/0092015 A1 | 4/2015 | Stafford | |
| 2015/0145887 A1 | 5/2015 | Forutanpour et al. | |
| 2016/0074750 A1 | 3/2016 | Wakeford et al. | |
| 2016/0124502 A1 | 5/2016 | Sawyer et al. | |
| 2016/0163107 A1* | 6/2016 | Chen | G01B 11/24 345/419 |
| 2016/0321841 A1* | 11/2016 | Christen | G06T 19/006 |
| 2017/0277256 A1* | 9/2017 | Burns | G02B 27/0093 |
| 2017/0309073 A1* | 10/2017 | SanGiovanni | G06F 3/1454 |

OTHER PUBLICATIONS

Williams et al., "Exploring Large Virtual Environments with an HMD when Physical Space is Limited", Proceedings of 4th Symposium on Applied Perception in Graphics and Visualization, Jul. 26-27, 2007, pp. 41-48.
"Oculus Mobile Development Documentation", Oculus CR, LLC, version 1.0.0.1, 2016, 134 pages.
Senin, "Dynamic Time Warping Algorithm Review", Information and Computer Science Department, University of Hawaii at Manoa, Dec. 2008, 23 pages.
International Preliminary Report on Patentability for International Application No. PCT/US2017/032849, dated May 8, 2018, 16 pages.
International Search Report and Written Opinion received for PCT Patent Application No. PCT/US2017/032849, dated Jan. 2, 2018, 17 pages.
Extended European Search Report for European Application No. 19155927.7, dated Jun. 24, 2019, 8 pages.

* cited by examiner

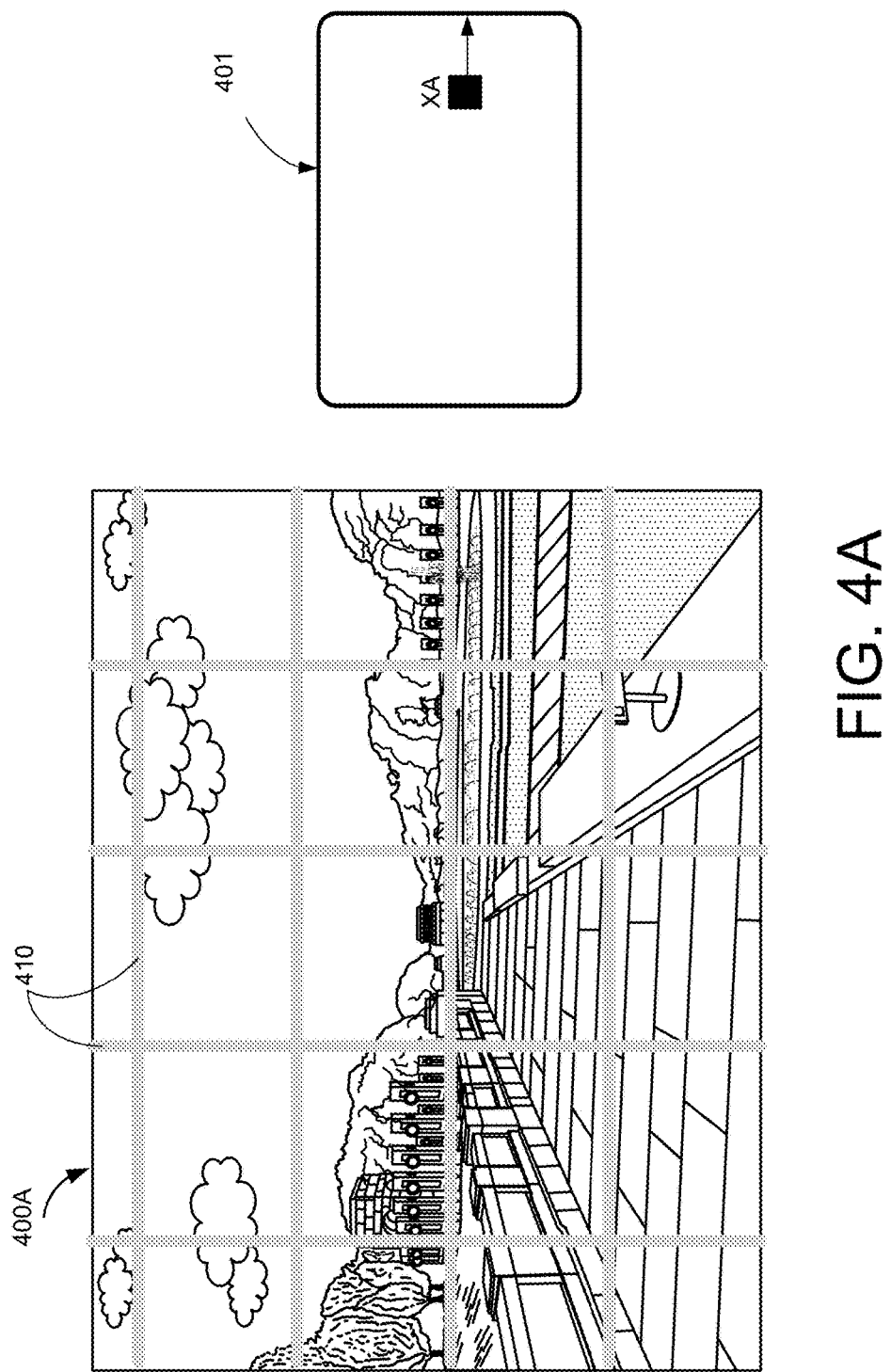

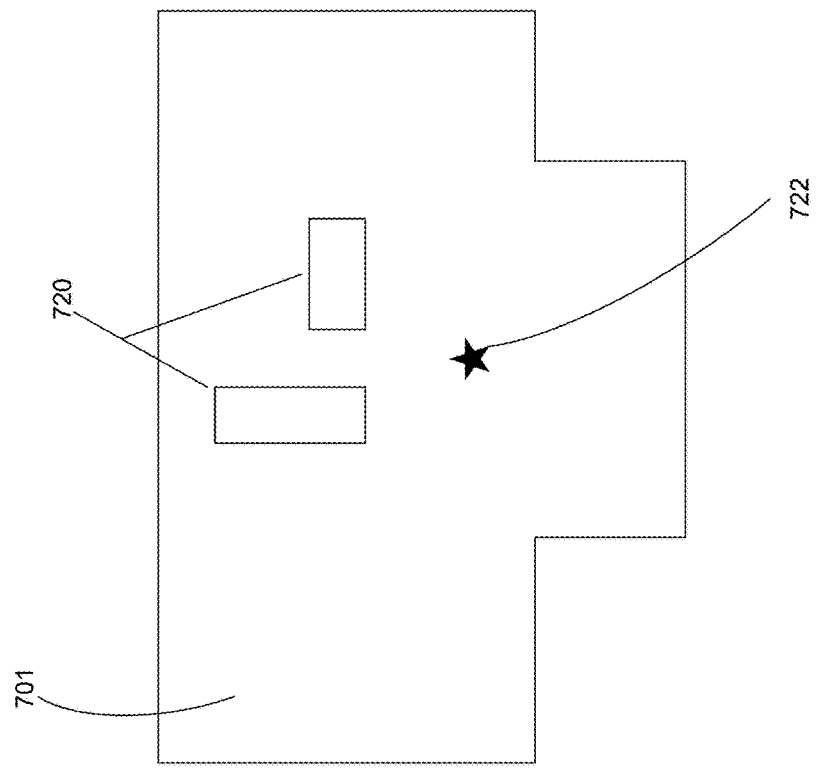

TECHNIQUES TO CHANGE LOCATION OF OBJECTS IN A VIRTUAL/AUGMENTED REALITY SYSTEM

CROSS-REFERENCE TO RELATED APPLICATIONS

This application claims priority to U.S. Provisional Patent Application No. 62/337,628, filed on May 17, 2016, entitled "TECHNIQUES TO CHANGE LOCATION OF OBJECTS IN A VIRTUAL/AUGMENTED REALITY SYSTEM", the disclosure of which is incorporated by reference herein in its entirety.

FIELD

This document relates, generally, to a virtual or augmented reality system.

BACKGROUND

In an immersive experience, such as an experience generated by a Virtual Reality (VR) system or an Augmented Reality (AR) system, boundaries in a real world environment, or physical space, may affect a user's ability to fully experience a continuous virtual world environment generated by the system.

SUMMARY

In one aspect, a method, may include generating, by a head-mounted audio visual device, a virtual world immersive experience within a virtual space while physically moving within a physical space, displaying, by the head-mounted audio visual device within the virtual space, a visual target marker indicating a target location in the physical space, receiving, by the head-mounted audio visual device, a teleport control signal, and moving a virtual location of the head-mounted audio visual device within the virtual space from a first virtual location to a second virtual location in response to receiving the teleport control signal.

In another aspect, in a non-transitory computer-readable storage medium storing instructions that, when executed, cause a computing device to perform a process, the instructions may include instructions to generate, by a head-mounted audio visual device, a virtual world immersive experience within a virtual space while physically moving within a physical space, display, by the head-mounted audio visual device within the virtual space, a visual target marker indicating a target location in the physical space, receive, by the head-mounted audio visual device, a teleport control signal, and move a virtual location of the head-mounted audio visual device within the virtual space from a first virtual location to a second virtual location in response to receiving the teleport control signal.

In another aspect, an apparatus comprising at least one processor and at least one memory including computer instructions, when executed by the at least one processor, cause the apparatus to: generate, by a head-mounted audio visual device, a virtual world immersive experience within a virtual space while physically moving within a physical space, display, by the head-mounted audio visual device within the virtual space, a visual target marker indicating a target location in the physical space, receive, by the head-mounted audio visual device, a teleport control signal, and move a virtual location of the head-mounted audio visual device within the virtual space from a first virtual location to a second virtual location in response to receiving the teleport control signal.

In another aspect, a method, may include generating, by a head-mounted audio visual device, a virtual world immersive experience within a virtual space while physically moving within a physical space, receiving, by the head-mounted audio visual device, a teleport control signal, and moving, in response to the teleport control signal, an object of interest in the virtual space to a location in the virtual space that corresponds to a target location in the physical space.

In another aspect, in a non-transitory computer-readable storage medium storing instructions that, when executed, cause a computing device to perform a process, the instructions may include instructions to generate, by a head-mounted audio visual device, a virtual world immersive experience within a virtual space while physically moving within a physical space, receive, by the head-mounted audio visual device, a teleport control signal, and move, in response to the teleport control signal, an object of interest in the virtual space to a location in the virtual space that corresponds to a target location in the physical space.

In another aspect, an apparatus comprising at least one processor and at least one memory including computer instructions, when executed by the at least one processor, cause the apparatus to: to generate, by a head-mounted audio visual device, a virtual world immersive experience within a virtual space while physically moving within a physical space, receive, by the head-mounted audio visual device, a teleport control signal, and move, in response to the teleport control signal, an object of interest in the virtual space to a location in the virtual space that corresponds to a target location in the physical space.

The details of one or more implementations are set forth in the accompanying drawings and the description below. Other features will be apparent from the description and drawings, and from the claims.

BRIEF DESCRIPTION OF THE DRAWINGS

FIGS. 4A-4C illustrate an example implementation of a system for changing location of objects in an immersive virtual experience, in accordance with an embodiment broadly described herein.

FIG. 7 is a diagram illustrating a physical space that includes objects, where a target location of a walkable area of the physical space is indicated, according to an example embodiment.

DETAILED DESCRIPTION

Figure 1:
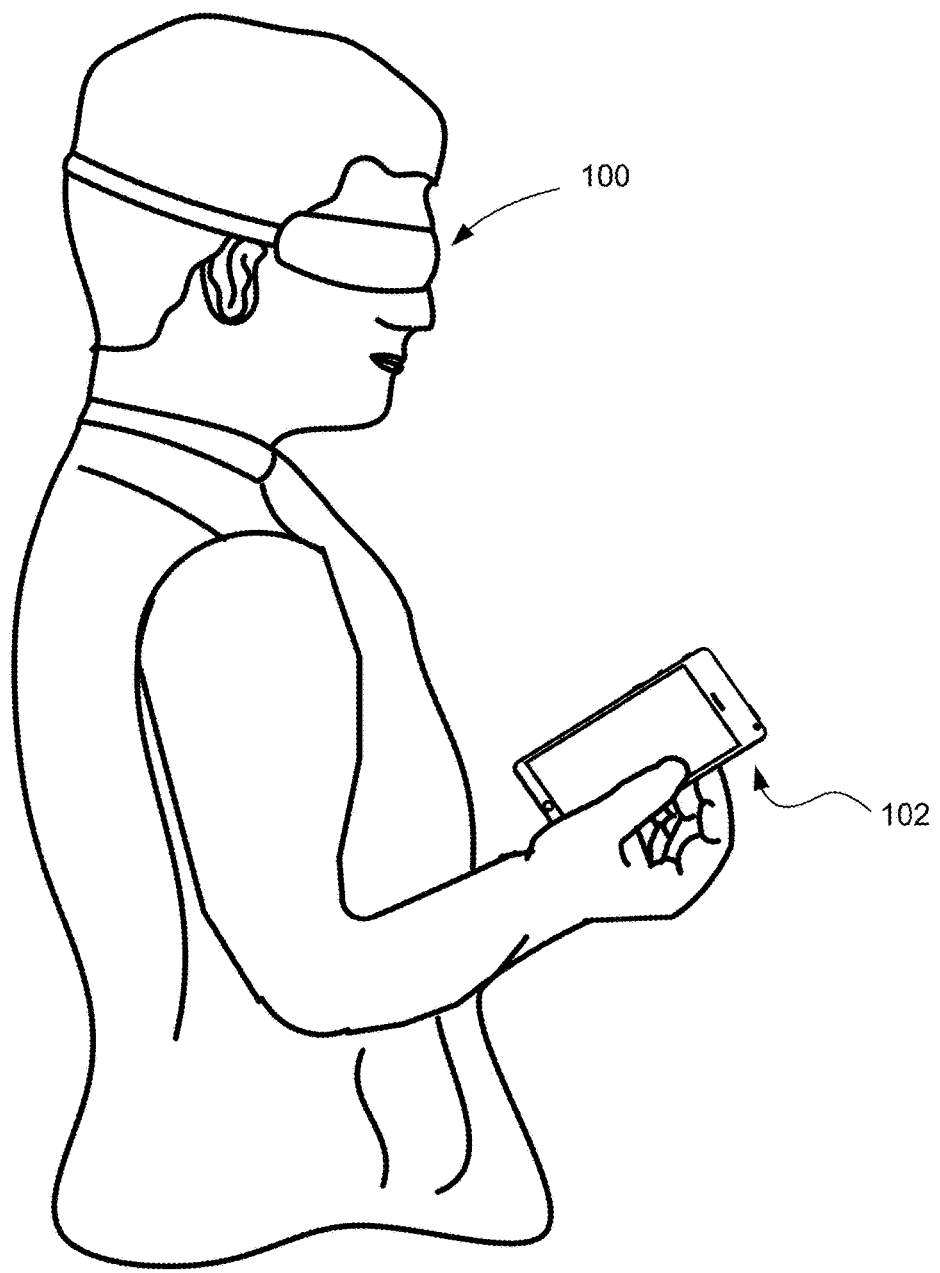
FIG. 1 is an example implementation of a virtual reality system.

A Virtual Reality (VR) system and/or an Augmented Reality (AR) system may include, for example, a head-mounted audio visual device, such as, for example, a head mounted display (HMD) device or similar device worn by a user, for example, on a head of the user, to generate an immersive virtual world environment to be experienced by the user. Movement of the user in the real world environment, or physical space, may be translated into corresponding movement in the virtual world environment or virtual space. Differences in the physical boundaries of the real world (or physical space), such as, for example, the confines of a room (e.g., walls) and/or objects in the room, may disrupt the user's movement in what may otherwise be a seemingly endless virtual world.

According to an example embodiment, an example technique may include generating, by a head-mounted audio visual device (e.g., HMD), a virtual world immersive experience within a virtual space while physically moving within a physical space, displaying, by the head-mounted audio visual device within the virtual space, a visual target marker indicating a target location in the physical space, receiving, by the head-mounted audio visual device, a teleport control signal, and moving a virtual location of the head-mounted audio visual device within the virtual space from a first virtual location to a second virtual location in response to receiving the teleport control signal. In this manner, according to an example embodiment, the user may use the visual target marker (which may indicate a target location, such as an approximate center, of the physical space) as a directional guide to walk or move to the target location (e.g., approximate center) in the physical space. For example, after the user has moved or walked to or near the target location in the physical space (e.g., by using the visual target marker as a guide), the user may be teleported (or moved from a first virtual location to a second virtual location). In this manner, the user may walk or move to (or towards) the visual target marker to obtain additional space/room in the physical space to allow the user to move and interact while playing a game on the virtual reality system (e.g., HMD). Thus, in this example embodiment, a user may move or walk to (or towards) a target location in the physical space based on a display of a visual target marker in the virtual space, and then the user may teleport (change virtual locations) to an object or location of interest in the virtual space.

According to another example embodiment, a technique may include generating, by a head-mounted audio visual device (e.g., HMD), a virtual world immersive experience within a virtual space while physically moving within a physical space, receiving, by the head-mounted audio visual device, a teleport control signal, moving, in response to the teleport control signal, an object of interest in the virtual space to a location in the virtual space that corresponds to a target location in the physical space. In this example embodiment, rather than displaying a visual target marker in the virtual space, an object of interest in the virtual space may be moved to a location in the virtual space that corresponds to the target location in the physical space. In this example embodiment, a user, for example, may then typically move or walk to the target location in order to interact with the object of interest. Other various details and example features will now be described.

In the example implementation shown in FIG. 1, a user may wear a head-mounted audio visual device, such as, for example, a head mounted display (HMD) 100. As shown in FIG. 1, the user wearing HMD 100 is holding a portable, or handheld, electronic device 102, such as, for example, a smartphone, or other portable handheld electronic device (or electronic handheld controller) that may be paired with, or operably coupled with, and communicate with, the HMD 100 via, for example, a wired connection, or a wireless connection such as, for example, a Wi-Fi or Bluetooth connection, or other wireless connection. This pairing, or operable coupling, may provide for communication and exchange of data between the handheld electronic device 102 and the HMD 100, so that the handheld electronic device 102 may function as a controller (e.g., handheld controller) in communication with the HMD 100 for interacting in the immersive virtual world experience generated by the HMD 100. In the example shown in FIG. 1, the user is holding the handheld electronic device 102 with his right hand. However, the user may also hold the handheld electronic device 102 in his left hand, or in both his left hand and his right hand, and still interact with the immersive virtual world experience generated by the HMD 100. As noted, the user wears the HMD 100 (as an example of a head-mounted audio visual device) and may be holding (and possibly operating) the handheld electronic device 102. Thus, when the user moves, e.g., changes location or orientation within the physical space, the HMD 100 (and possibly the handheld electronic device 102) will also change locations and/or orientations within the physical space, based on the movement of the user.

Figure 2A:
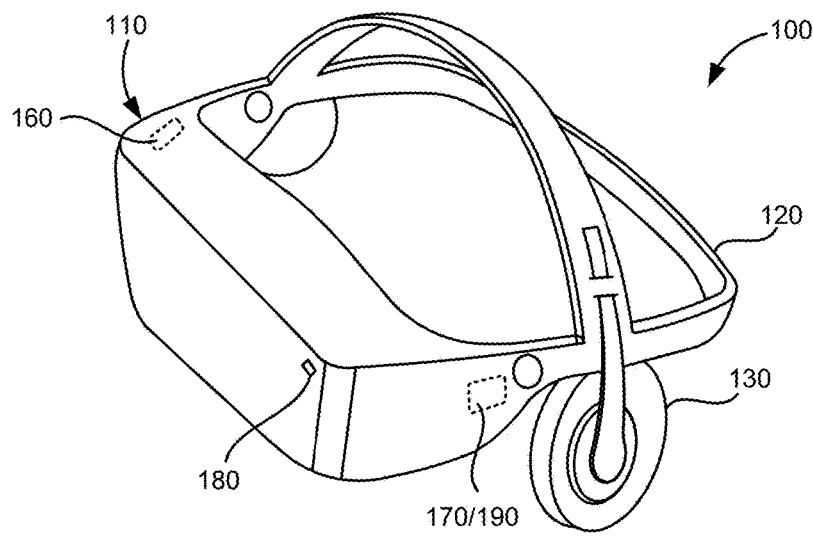
FIGS. 2A and 2B are perspective views of a head mounted display device, in accordance with an embodiment broadly described herein.
Figure 2B:
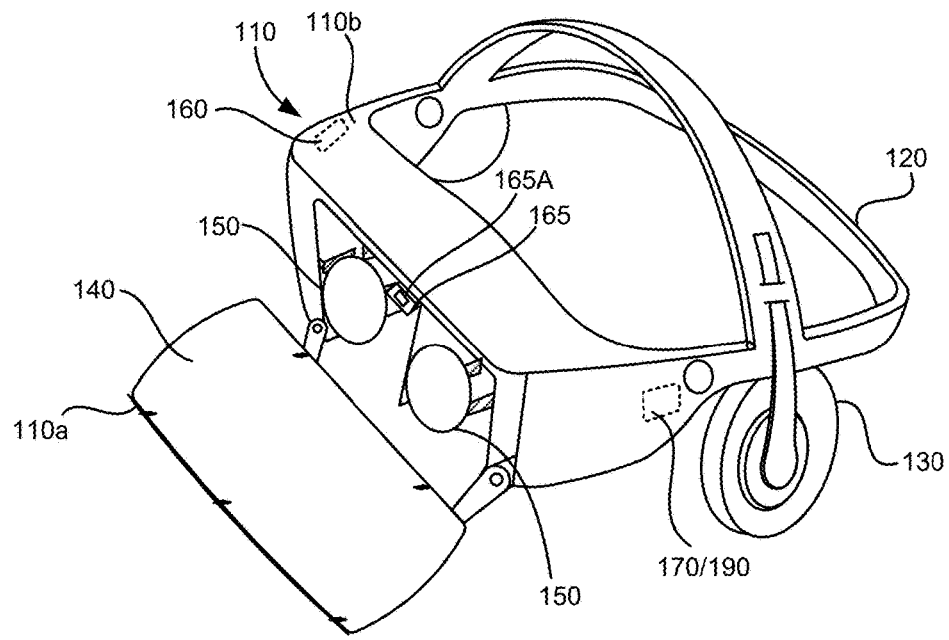

FIGS. 2A and 2B are perspective views of an example HMD, such as, for example, the HMD 100 worn by the user in FIG. 1, to generate an immersive virtual experience. The HMD 100 may include a housing 110 coupled, for example, rotatably coupled and/or removably attachable, to a frame 120. An audio output device 130 including, for example, speakers mounted in headphones, may also be coupled to the frame 120. In FIG. 2B, a front face 110a of the housing 110 is rotated away from a base portion 110b of the housing 110 so that some of the components received in the housing 110 are visible. A display 140 may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be may be aligned with respective optical axes of the user's eyes to provide a relatively wide field of view and relatively short focal length. In some embodiments, the HMD 100 may include a sensing system 160 including various sensors and a control system 170 including a processor 190 and various control system devices to facilitate operation of the HMD 100.

In some embodiments, the HMD 100 may include a camera 180 to capture still and moving images of the real world environment outside of the HMD 100. In some embodiments the images captured by the camera 180 may be displayed to the user on the display 140 in a pass through mode, allowing the user to temporarily view the real world without removing the HMD 100 or otherwise changing the configuration of the HMD 100 to move the housing 110 out of the line of sight of the user.

In some embodiments, the HMD 100 may include an optical tracking device 165 to detect and track user eye movement and activity. The optical tracking device 165 may include, for example, an image sensor 165A to capture images of the user's eyes, and in some embodiments, a particular portion of the user's eyes, such as, for example, the pupil. In some embodiments, the optical tracking device 165 may include multiple image sensors 165A positioned to detect and track user eye activity. In some embodiment, the optical tracking device 165 may detect and track optical gestures such as, for example eyelid movement associated with opening and/or closing of the user's eyes (e.g., closing for a threshold period of time and then opening, opening for a threshold period of time and then closing, closing and/or opening in particular pattern). In some embodiments, the optical tracking device 165 may detect and track an eye gaze direction and duration. In some embodiments, the HMD 100 may be configured so that the optical activity detected by the optical tracing device 165 is processed as a user input to be translated into a corresponding interaction in the immersive virtual world experience generated by the HMD 100.

Figure 3:
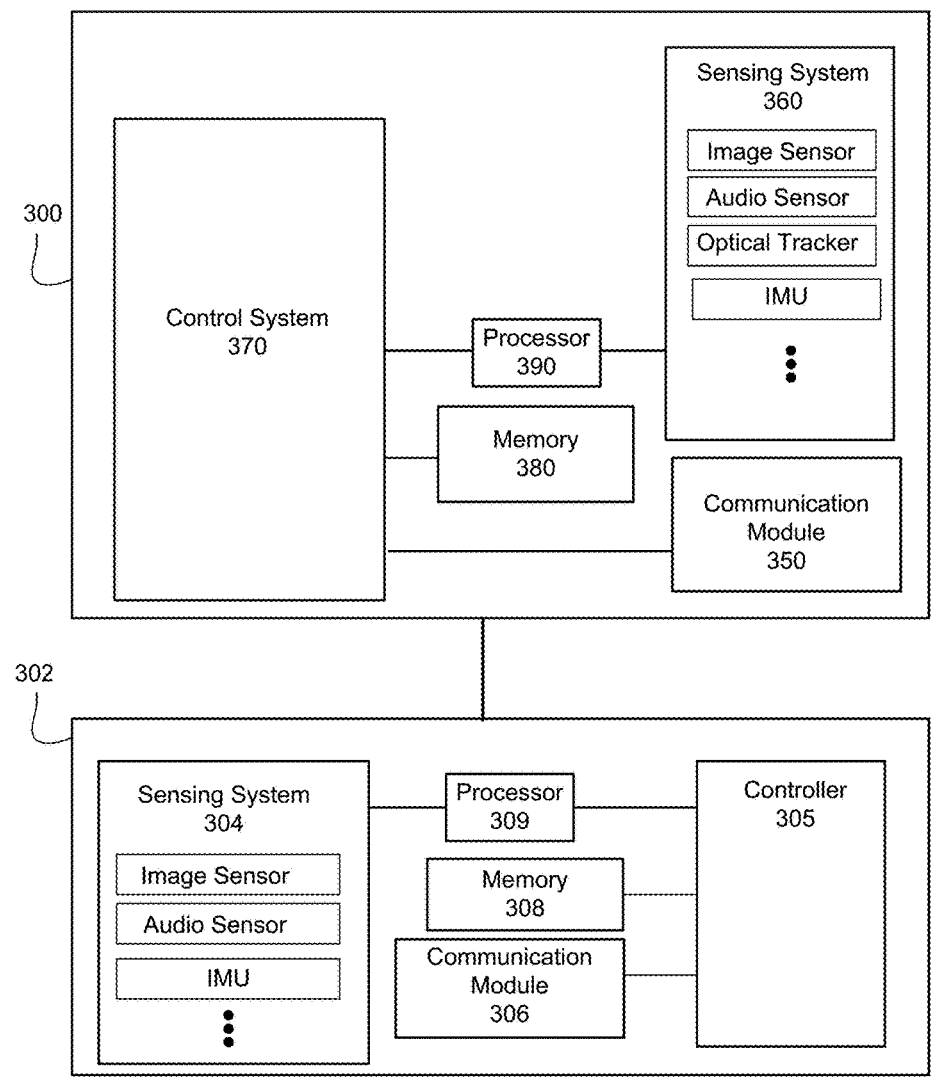
FIG. 3 is a block diagram of a virtual reality system, in accordance with an embodiment broadly described herein.

FIG. 3 is a block diagram of a virtual reality system, in accordance with an embodiment broadly described herein. The system may include a first user electronic device 300. In some embodiments, the first user electronic device 300 may be in communication with a second user electronic device 302. The first user electronic device 300 may be, for example an HMD as described above with respect to FIGS. 1, 2A and 2B, generating an immersive virtual immersive experience, and the second user electronic device 302 may be, for example, a handheld electronic device as described above with respect to FIG. 1, in communication with the first user electronic device 300 to facilitate user interaction with the virtual immersive experience generated by the HMD.

The first electronic device 300 may include a sensing system 360 and a control system 370, which may be similar to the sensing system 160 and the control system 170, respectively, shown in FIGS. 2A and 2B. The sensing system 360 may include numerous different types of sensors, including, for example, a light sensor, an audio sensor, an image sensor, a distance/proximity sensor, an inertial measurement system including for example and accelerometer and gyroscope, and/or other sensors and/or different combination(s) of sensors. In some embodiments, the light sensor, image sensor and audio sensor may be included in one component, such as, for example, a camera, such as the camera 180 of the HMD 100 shown in FIGS. 2A and 2B. In some embodiments, the sensing system 360 may include an image sensor positioned to detect and track optical activity of the user, such as, for example, a device similar to the optical tracking device 165 shown in FIG. 2B. The control system 370 may include numerous different types of devices, including, for example, a power/pause control device, audio and video control devices, an optical control device, a transition control device, and/or other such devices and/or different combination(s) of devices. In some embodiments, the sensing system 360 and/or the control system 370 may include more, or fewer, devices, depending on a particular implementation. The elements included in the sensing system 360 and/or the control system 370 can have a different physical arrangement (e.g., different physical location) within, for example, an HMD other than the HMD 100 shown in FIGS. 2A and 2B.

The first electronic device 300 may also include a processor 390 in communication with the sensing system 360 and the control system 370, a memory 380 accessible by, for example, a module of the control system 370, and a communication module 350 providing for communication between the first electronic device 300 and another, external device, such as, for example, the second electronic device 302 paired to the first electronic device 300.

The second electronic device 302 may include a communication module 306 providing for communication between the second electronic device 302 and another, external device, such as, for example, the first electronic device 300 paired with the second electronic device 302. In addition to providing for the exchange of, for example, electronic data between the first electronic device 300 and the second electronic device 302, in some embodiments, the communication module 306 may also be configured to emit a ray or beam. The second electronic device 302 may include a sensing system 304 including, for example, an image sensor and an audio sensor, such as is included in, for example, a camera and microphone, an inertial measurement unit, a touch sensor such as is included in a touch sensitive surface of a handheld electronic device, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

In some embodiments, in a virtual reality system, a user may physically move in a prescribed physical space, or real world space, in which the system is received and operated. The system may track the user's movement in the real world space, and cause movement in the virtual world in coordination with the user's movement in the real world. In other words, the movement of the user in the real world (or physical) space may be translated into movement in the virtual world (virtual space) to generate a heightened sense of presence in the virtual world (virtual space). Simply for ease of discussion and illustration, the real world (or physical) space may, for example, hereinafter be considered a room, having walls, a floor and a ceiling defining the physical boundaries of the physical space. In contrast, the virtual space may be essentially without boundary, with the user's virtual movement in the virtual world only limited by the confines, or boundaries of the room in which the virtual reality system is operated.

In some embodiments, the boundaries of the room, for example, the relative positioning of the walls, location and boundaries of any furniture or other objects in the room, etc., may be known by the virtual reality system. This may be accomplished by, for example, a scan of the room upon initiation of a virtual immersive experience and calibration of the relative positions of the walls or other objects in the room, installation of the virtual reality system in a room having a standard and/or known configuration, and the like. In some embodiments, the virtual reality system may be set to detect physical boundaries such as walls or other objects (e.g., chair, desk, table, bed, couch, etc.) as the user approaches. The term boundary, with respect to the physical space, may include a boundary of a wall or perimeter of the physical space, as well as a boundary of an object (e.g., couch, chair, table) within the physical space.

In some embodiments, once a physical configuration of the room in which the virtual reality system is operated is known (including boundaries defined by walls), a size, or extent, of the virtual world environment (virtual space) may simply be designed and/or adapted to fit within the confines or boundaries of the physical space in which the virtual reality system is operated. However, this may be unnecessarily limiting on a system capable of generating a significantly more extensive virtual world environment otherwise capable of accommodating more extensive user movement and exploration.

In an example embodiment, as the user moves in the physical space and correspondingly in the virtual space, the user may approach a boundary in the physical space, such as, for example, a wall or other object (either known or detected real time by the system). In some cases, as the user continues moving towards the boundary, the user (and HMD 100 worn by the user) may even collide with the boundary in the physical space. In an example embodiment, the system may generate and display, on a display of the HMD 100 within the virtual space, a visual boundary (or audio/visual alert) indicating the (e.g., presence or close proximity of the) boundary to the user/HMD 100 in the physical space. In an example embodiment, a visual boundary may be displayed on the display of HMD 100 in the form of a grid (e.g., see visual boundary 410, FIG. 4A) overlaid on the display of the virtual space, or other type of visual indicator. The grid is merely one illustrative example of a visual boundary, and many other forms or types of visual boundaries may be provided. An audible tone or audible alert may also be output by HMD 100 to further alert the user to the (e.g., close proximity of the) boundary in the physical space.

For example, according to an example embodiment, the visual boundary may be displayed if the user comes within a threshold distance (e.g., 12 inches) of the boundary. However, different users may travel at different speeds, and each user may vary his speed/velocity (where velocity may include speed and direction of travel) over time. Thus, as an illustrative example, while one particular threshold distance may be used to provide a visual boundary for a slow-moving user, the same threshold distance may not be an adequate distance to warn a much faster moving user of a physical boundary. Thus, at least in some cases, the use of a threshold distance, by itself, may be an inadequate trigger for a visual boundary or alert to indicate a presence of close proximity of a boundary or object in the physical space.

Therefore, according to example embodiment, HMD 100 may display, in the virtual space, a visual boundary indicating (or alerting the user to) the boundary (or close/near proximity of such boundary) of the physical space if the user/HMD 100 estimates that the user/HMD 100 will collide with the boundary in the physical space in less than (or within) a threshold period of time (e.g., 3 seconds). For example, by displaying a visual boundary on HMD 100, to alert the user of the close proximity of the boundary in the physical space, based on an estimated time to collision, this technique may advantageously take into account, for example, a user's location and velocity (direction and speed), not just location (or distance from the boundary). This approach may result in a safer virtual world immersive experience for a user, e.g., based on a visual boundary (or other alert) being displayed to the user. This technique may, for example, provide a user with a sufficient (or more consistent) period of time to stop or alter his/her course, before colliding with a boundary in the physical space, even though the user may vary his speed.

Thus, for example, the user (wearing HMD 100) may move in the physical space (or real world), and that real world (physical space) movement may be translated into corresponding movement in the virtual space. An example of a scene 400A, as displayed and viewed by the user, for example, on the display 140 of the HMD 100, as the user moves in the physical space 401, and correspondingly in the virtual world (virtual space) scene 400A, is shown in FIG. 4A. In FIG. 4A, the user is at position XA, and moving in the direction of the arrow, towards a boundary 412 (e.g., wall) of the physical space 401. As the user continues to move and approaches boundary 412 of the physical space 401 or room, (either known or detected in real time by the system), the HMD 100 may display a visual boundary 410 (or an audio/visual alert) if the HMD 100 determines (or estimates) that the user/HMD 100 will collide with boundary 412 in less than (or within) a threshold period of time. For example, the HMD may periodically (e.g., every 100 ms) determine one or more updated parameters for the user/HMD 100, such as the user's location, distance to a boundary 412, and the user's velocity (direction of travel and speed), as some example parameters. For example, based on one or more of these parameters, e.g., such as the user's location and velocity, the HMD may, from time to time, or periodically, e.g., every 100 ms or other time period, may estimate a time-to-collision (or time until collision) with one or more nearby boundaries in the physical space. Instantaneous values or average values of speed may be used, for example, to estimate a time-to-collision with the boundary for the user/HMD.

For example, if the HMD 100 estimates that the user/HMD will collide with the boundary 412 in the physical space in less than (or within) a threshold period of time, then the HMD 100 will then display, in the virtual space, a visual boundary 410 to the user to alert the user to the close proximity of the boundary 412 in the physical space. Or, in other words, the HMD 100 may display a visual boundary 410 to the user indicating the (e.g., close proximity of the) boundary 412 of the physical space 401 at least a threshold period of time before the user/HMD is estimated to collide with the boundary of the physical space.

While the virtual space may have no bounds, any physical space, such as a room, will have a number of different boundaries, such as walls and other objects (e.g., desk, chair, couch, . . . ). For example, as shown in FIG. 4A, when a user/HMD 100 reaches a boundary 412, it may be advantageous for the user to move away from the boundary to create additional physical space. According to an example embodiment, it may be advantageous for the user device to relocate (move) to (or at least towards) or near a center, or other target location, of a physical space 401, e.g., in order to provide the user with more space or room to move and interact. Physical spaces, such as rooms, may be different shapes and sizes, with varying objects therein. Thus, it may be advantageous for the user to relocate to (or near) a target location that may provide the user with more space/room to interact (e.g., such as a center of the physical space, an approximate center of the physical space, to a location within a threshold distance of the target location in the physical space or within a threshold distance of center or at or within a target location or center of the walkable area of the physical space 401, or other target location). Thus, the target location may be any location. In an example embodiment, the target location may be, for example, selected (either in real time or selected or predetermined in advance) to provide the user with more (or sufficient) room to move or interact, as compared to the user being adjacent to a boundary (e.g., wall) of the physical space where there is less room, or may be insufficient room to move/interact. The use of a center of a physical space 401 is merely an illustrative example of a target location, and other target locations may be used, such as a location that may be offset from the target location or center, or a location within a threshold distance from the target location or center, or other target location. However, the user may not know where the target location in the physical space 401 is located, nor even what direction to walk to move towards the target location in the physical space.

Figure 4B:
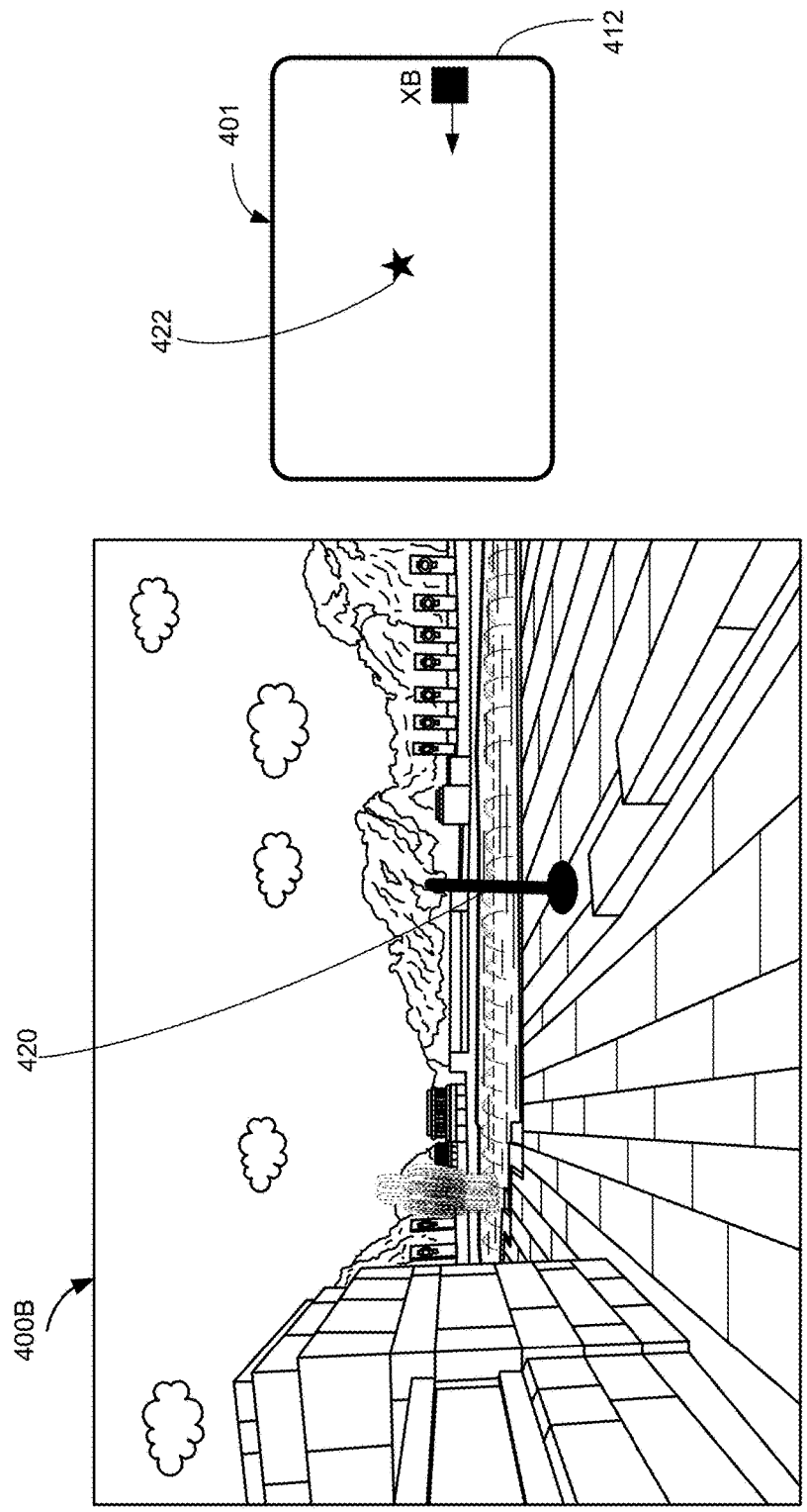

Therefore, according to an example embodiment, HMD 100 may display in the virtual space a visual target marker indicating a target location in the physical space. FIG. 4B is a diagram illustrating a scene 400B in the virtual space that includes a visual target marker 420. For example, a user at location XB, may turn away from boundary 412, and may see the visual target marker 420 that indicates or correlates to a target location 422 in the physical space, for example. The user may then walk or move towards the visual target marker 420, and thus, move towards the target location 422 in the physical space 401. The HMD 100 may determine a target location 422 of a physical space 401, e.g., such as a center of a walkable area within the physical space 401 (e.g., in the event that objects may be present in the room that may affect the walkable area). In an example embodiment, the visual target marker 420 may be displayed in the virtual space at a location that coincides with a target location 422 in the physical space a target location of a walkable area of the physical space. Alternatively, the visual target marker 420 may be displayed at a location within the virtual space that may be within a threshold distance of the target location 422 in the physical space 401. By displaying, in the virtual space, a visual target marker 420 indicating a target location in the physical space (such as either the physical space, or the walkable area of the physical space), this may be used by the user as a guide to walk back to or towards the target location 422 in the physical space 401.

According to an example embodiment, a visual target marker 420, which may indicate or correspond to a target location of a physical space, may be displayed in the virtual space in response to specific actions or specific conditions. For example, a visual target marker 420 may be displayed whenever one or more of the following conditions occurs, by way of example: the user is at or within a threshold distance of a boundary (e.g., boundary 412) of the physical space 401; a user or HMD is re-oriented (e.g., turns or rotates) away from the boundary 412 and/or towards the target location 422 in the physical space; a user may select a transport mode (to allow the user to change locations in the virtual space), or select a transport control signal, e.g., via selection or actuation of an input on handheld electronic device (or handheld controller) 302. Also, when the user/HMD is at or within a threshold distance of a boundary 412 of the physical space, the HMD may display, in the virtual space, a visual boundary 410 and/or a visual target marker 420.

According to an example implementation, HMD 100 may continue displaying the visual target marker 420 within the virtual space for a predetermined time period, or until the user/HMD is at or within a threshold distance of the target location 422 in the physical space or at or within a threshold distance of the visual target marker 420. HMD 100 may also continue displaying the visual target marker 420 within the virtual space so long as the user is within a walkable path within the physical space between the boundary 412 (e.g., where a proximity of the user to such boundary 412 may have triggered display of such visual target marker 420) and the target location 422, or the user is within a walkable path towards the visual target marker 420, or so long as the user is within a walkable path between an initial location in the virtual space and the visual target marker 420 in the virtual space. For example, if the user turns away from the visual target marker 420/target location 422, or comes within a threshold distance of the visual target marker 420/target location 422, or moves to a location that is not within the walkable path towards the visual target marker 420/target location 422, then the HMD 100 may cease or discontinue displaying the visual target marker 420 within the virtual space (e.g., because, in any of these cases, the HMD 100 may assume that the user is no longer attempting to move to/towards the target location 422 in the physical space 401).

Figure 4C:
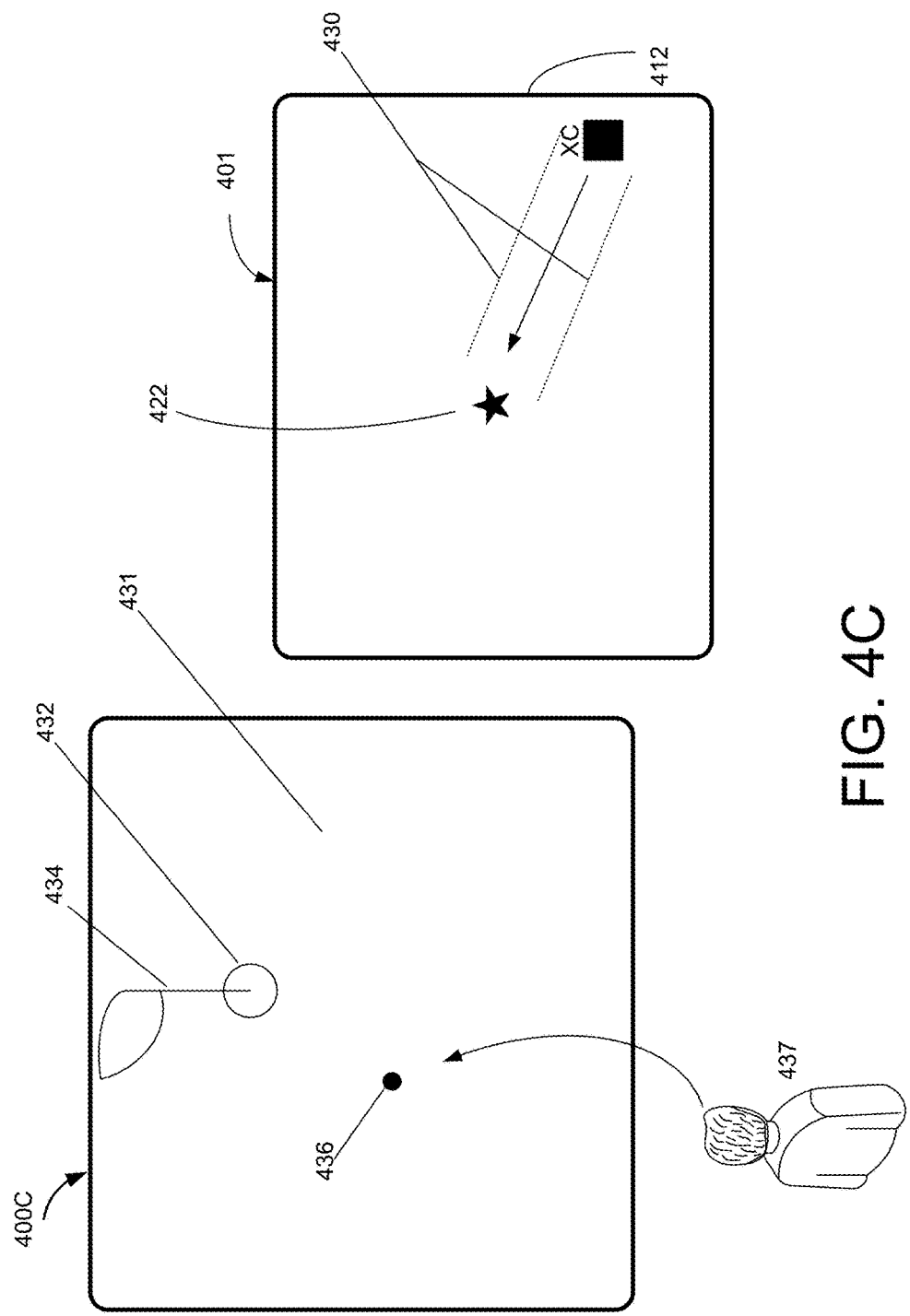

FIG. 4C is a diagram illustrating a virtual scene 400C in a virtual space and a physical space 401 according to an example embodiment. In the illustrative example shown in FIG. 4C, the virtual scene 400C is provided for a virtual golf game, e.g., where virtual scene 400C displays a golf green 431, a golf hole (or cup) 432, a flag stick 434 for the golf hole, and the user's golf ball 436. In this illustrative example, the golf ball 436 may be an object of interest for the user, and the user 437 (who may be viewing the virtual scene 400C using a virtual reality system (e.g., an HMD 100)) may want to move his/her location in virtual space from a first virtual location to a second virtual location (to or near the object of interest/golf ball 436).

Referring to FIG. 4C, a user may initially be at location XC at or within a threshold distance of boundary 412 of physical space 401. Being at location XC may cause a visual boundary (similar to visual boundary 410) and/or a visual target marker (similar to visual target marker 420) to be displayed in the virtual space. Alternatively, HMD 100 may display a visual target marker in the virtual space when the user or HMD is re-oriented (e.g., turns or rotates) away from the boundary 412 and/or rotates towards the target location 422 in the physical space 401, or when the user selects a transport mode (to allow the user to change locations in the virtual space), or selects a transport control signal, e.g., via selection or actuation of an input on handheld electronic device (or handheld controller) 302. After turning away from boundary 412 and/or turning at least partially towards target location 422/visual target marker 420, the user may move or walk along a walkable path 430 towards or to a target location 422 of physical space 401, where a location of the target location may be indicated to the user in the virtual space based on the display of a visual target marker 420, for example. In an example embodiment, the visual target marker may continue to be displayed in the virtual space so long as the user continues on or within the walkable path 430 until the user arrives at the target location 422 or visual target marker 420 or comes within a threshold distance of the target location 422 or visual target marker 420, or stands on or near the target location 422 or visual target marker 420. At such time, a display of the visual target marker 420 may be discontinued or ceased, as any of these conditions may indicate that the user is no longer interested in moving towards the target location 422 in the physical space.

According to an example embodiment, after the user turns towards the target location 422 and walks along or within the walkable path 430 to target location 422 (or to be within a threshold distance of the target location 422) in the physical space 401, the user may, for example, select transport mode for the handheld electronic device 302, point to the object of interest (e.g., golf ball 436) and press or select a teleport control input, to request that the user is teleported to the object of interest. The HMD 100 may detect a relocation of the user 437/HMD 100 to a location at or near (e.g., within a threshold distance of) target location 422/visual target marker 420, detect or receive the pointing of the handheld electronic device 302 to the object of interest, and receive the teleport control signal. The teleport control signal may place a head mounted audio-visual device (or other object) in a teleport mode in which the audio-visual device (e.g., HMD) or other object may be teleported (or moved location within the virtual space). In response (e.g., in response to receiving the teleport control signal), the HMD 100 may teleport (e.g., change the location of the user or HMD from a first or initial location in virtual space to a second location in virtual space) the user 437 (or HMD 100) to or near the object of interest (e.g., golf ball 436) within virtual scene 400C, for example.

Example 1

Figure 5:
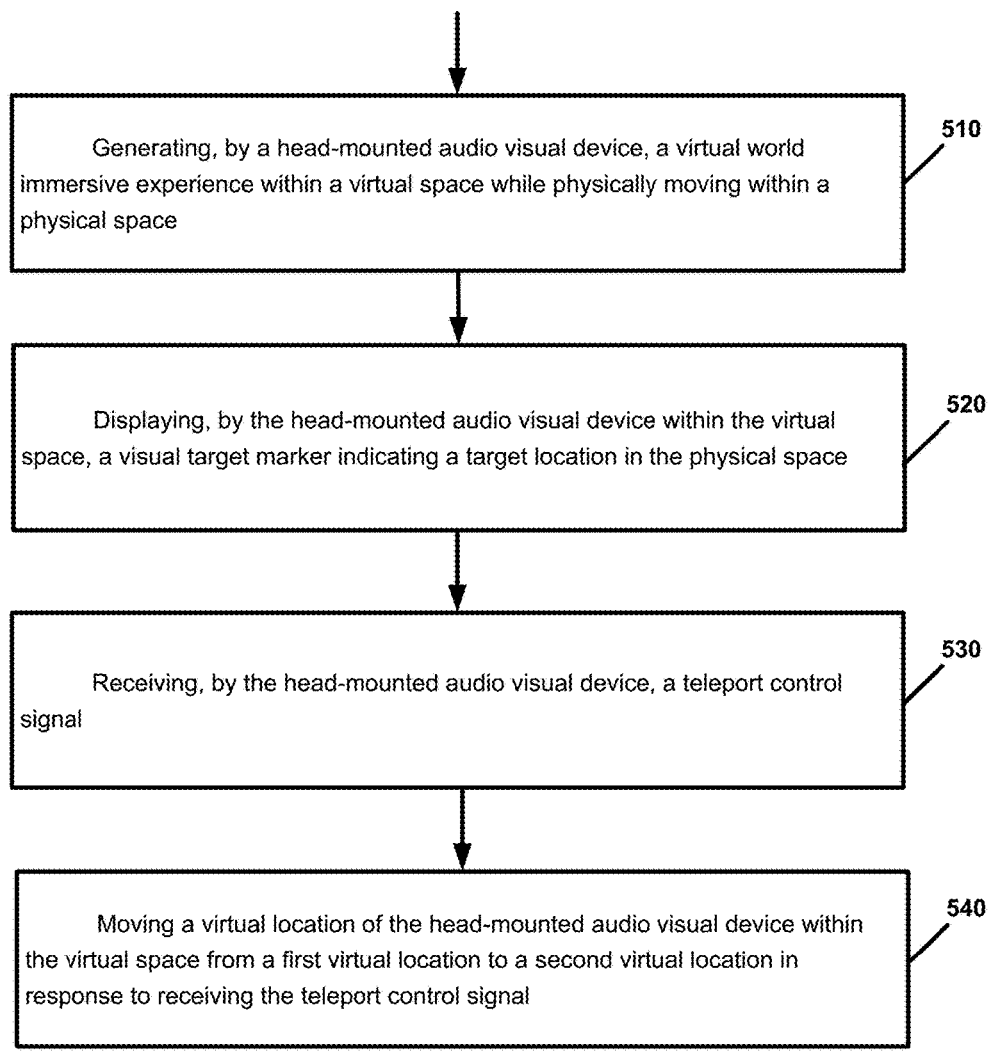
FIG. 5 is a flow chart illustrating operation of a head-mounted audio visual device according to an example embodiment.

FIG. 5 is a flow chart illustrating operation of a head-mounted audio visual device according to an example embodiment. An example of a head-mounted audio visual device may include HMD 100. Operation 510 includes generating, by a head-mounted audio visual device, a virtual world immersive experience within a virtual space while physically moving within a physical space. Operation 520 includes displaying, by the head-mounted audio visual device within the virtual space, a visual target marker indicating a target location in the physical space. Operation 530 includes receiving, by the head-mounted audio visual device, a teleport control signal. And, operation 540 includes moving a virtual location of the head-mounted audio visual device within the virtual space from a first virtual location (e.g., an initial location in virtual space of the audio visual device or HMD) to a second virtual location (e.g., to a target location in virtual space, such as for example, to a location in virtual space corresponding to or near a center of a room (or limited physical space) in the physical space, to a virtual location at or near an object of interest, or other location in the virtual space) in response to receiving the teleport control signal.

Example 2

According to an example embodiment of the method of example 1, the displaying may include displaying, by the head-mounted audio visual device within the virtual space, a visual target marker indicating a center of the physical space.

Example 3

According to an example embodiment of the method of any of examples 1-2, the displaying may include displaying, by the head-mounted audio visual device within the virtual space, a visual target marker indicating a target location in the physical space in response to at least one of the following: detecting that the head-mounted audio visual device is within a threshold distance of a boundary of the physical space; detecting that the head-mounted audio visual device has been re-oriented towards the target location in the physical space; and receiving either the teleport control signal or a signal from a controller to place the head-mounted audio visual device in a teleport mode.

Example 4

According to an example embodiment of the method of any of examples 1-3, the displaying may include continuing displaying the visual target marker until the head-mounted audio visual device is within a threshold distance of the target location in the physical space.

Example 5

According to an example embodiment of the method of any of examples 1-4, the displaying may include continuing displaying the visual target marker while the head-mounted audio visual device is within a walkable path within the physical space towards the target location or the visual target marker.

Example 6

According to an example embodiment of the method of any of examples 1-5, the displaying may include detecting that the head-mounted audio visual device is within a threshold distance of a boundary of the physical space; performing the following in response to the detecting: displaying, by the head-mounted audio visual device within the virtual space, a visual target marker indicating a target location in the physical space; and displaying, by the head-mounted audio visual device within the virtual space, a visual boundary indicating the boundary of the physical space.

Example 7

According to an example embodiment of the method of any of examples 1-6, the displaying may include performing the following in response to the receiving the teleport control signal: displaying, by the head-mounted audio visual device within the virtual space, a visual target marker indicating a target location in the physical space; and displaying, by the head-mounted audio visual device within the virtual space, a visual boundary indicating the boundary of the physical space.

Example 8

According to an example embodiment of the method of any of examples 1-7, the moving may include moving a virtual location of the head-mounted audio visual device within the virtual space from a first virtual location to an object of interest within the virtual space.

Example 9

According to an example embodiment of the method of any of examples 1-8, the method may further include estimating, by the head-mounted audio visual device, that the head-mounted audio visual device will collide with the boundary of the physical space in less than a threshold period of time; and displaying, by the head-mounted audio visual device within the virtual space, a visual boundary indicating the boundary of the physical space in response to the estimating.

Example 10

According to an example embodiment of the method of any of examples 1-9, the method may further include displaying, by the head-mounted audio visual device within the virtual space, a visual boundary indicating the boundary of the physical space at least a threshold period of time before the head-mounted audio visual device is estimated to collide with the boundary of the physical space.

Example 11

An apparatus comprising at least one processor and at least one memory including computer instructions, when executed by the at least one processor, cause the apparatus to: generate, by a head-mounted audio visual device, a virtual world immersive experience within a virtual space while physically moving within a physical space; display, by the head-mounted audio visual device within the virtual space, a visual target marker indicating a target location in the physical space; and receive, by the head-mounted audio visual device, a teleport control signal; and move a virtual location of the head-mounted audio visual device within the virtual space from a first virtual location to a second virtual location in response to receiving the teleport control signal.

Example 12

A non-transitory computer-readable storage medium storing instructions that, when executed, cause a computing device to perform a method of any of examples 1-10.

Example 13

An apparatus includes means for performing the method of any of examples 1-10.

Figure 6A:
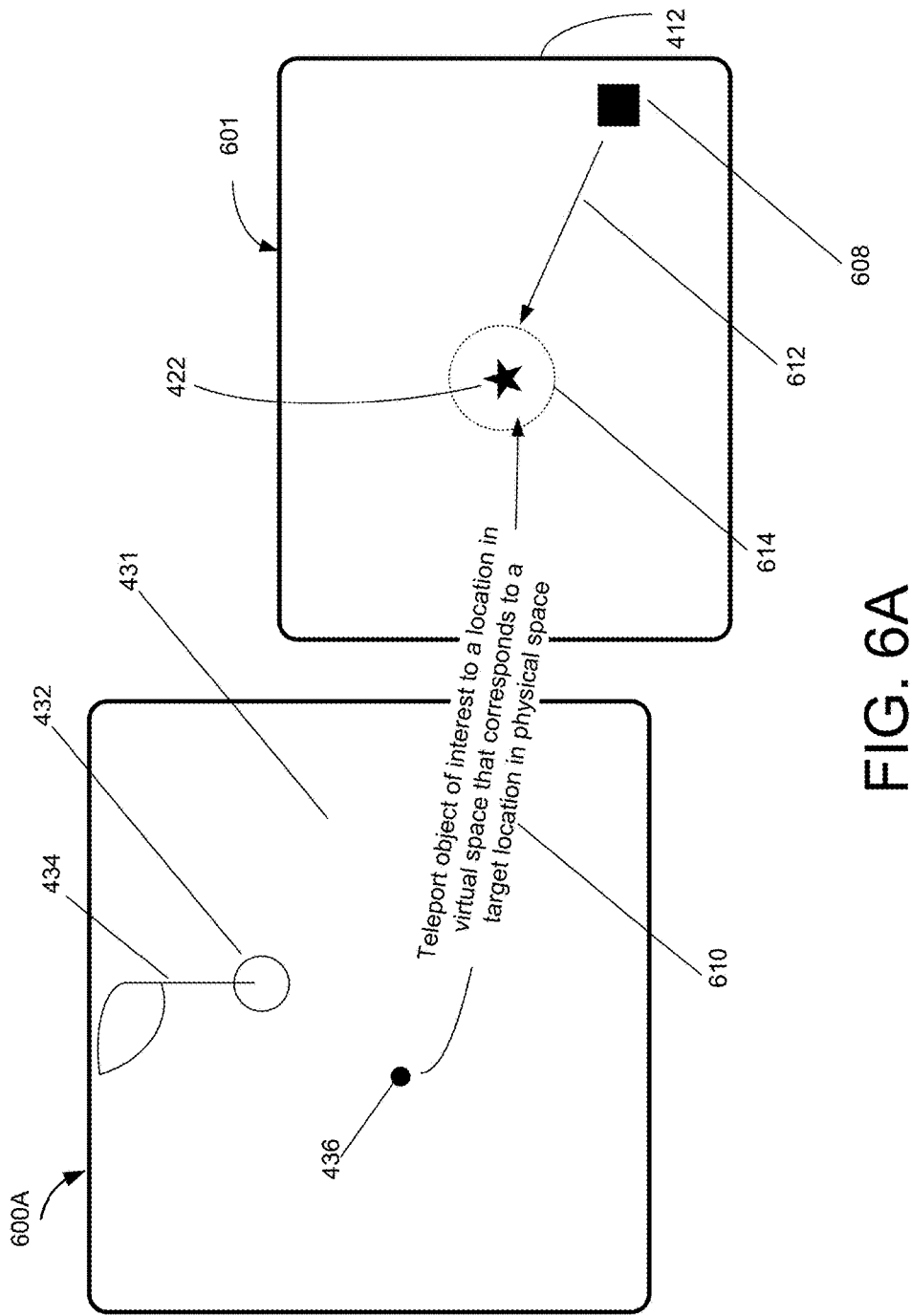
FIG. 6A is a diagram illustrating a virtual scene in a virtual space and a physical space according to an example embodiment in which an object of interest is teleported to a target location of the physical space.

FIG. 6A is a diagram illustrating a virtual scene in a virtual space 600A and a physical space 601 according to an example embodiment in which an object of interest is teleported to an approximate target location in the physical space. An object of interest may be established by default or may be predefined for a particular game or VR application, or an object of interest may be selected by a user, for example. In some of the example embodiments described above, e.g., with respect to FIGS. 4A and 4B, the HMD 100 may display a visual target marker (e.g., 420) in the virtual space at a location indicating a target location (e.g., 422) in the physical space (e.g., which may provide a guide to the user, to direct him to the target location 422), which may allow the user to walk or move to/towards the target location 422 in the physical space.

However, in the example embodiment shown in FIG. 6A, e.g., in response to a teleport control signal (e.g., requesting that the user be moved to a selected location or to a selected object of interest), an object of interest (e.g., golf ball 436 for a virtual golf game, or an enemy character in a virtual sword fight) in the virtual space may be moved (or teleported, via line 610) to a location in the virtual space that corresponds to a target location (e.g., center, approximate center, or other target location) in the physical space 601. According to an illustrative example embodiment, because the object of interest is now at a location that corresponds to the target location in the physical space 601, the user may typically (e.g., without necessarily identifying the target location in the physical space) move or walk to or towards the target location 422 in the physical space 601, so that the user may interact with the object of interest (e.g., swing a virtual golf club to strike the golf ball 436 for the golf game, or engage in sword fighting with the enemy character for the sword fighting game). Thus, in the example shown in FIG. 6A, after the object of interest has been moved to a virtual location that corresponds to the target location in the physical space 601, and the user 608 may move (via line 612) to (or near) the target location 422 in the physical space 601 to allow the user to engage or interact with the object of interest.

The target location in the physical space 601 may include one or more of the following: the center of the physical space 601; any point within a threshold distance of the center of the physical space 601 (the threshold distance may be a distance, such as 2 feet, or may be a percentage of the length or width of the physical space/room, such as 10% of the length or width of a the room); a target location, a center, or approximate center of a walkable area of the physical space 601 (described in further detail with respect to FIG. 6B); or, an interaction distance offset from the target location in (e.g., an interaction distance offset from a center of) the physical space (described in further detail with respect to FIG. 7).

According to an example embodiment, moving the object of interest in the virtual space to a location that corresponds to a target location in the physical space may, for example, include shifting the virtual space with respect to the physical space so that the object of interest is displayed or provided at a location in the virtual space that corresponds to the target location of the physical space (e.g., a center of the physical space, within a threshold distance of the center or the target location, within a threshold distance of a center of or other location within a walkable area of the physical space, or within an interaction distance offset of the center or the target location in the physical space). Or, to move the object of interest in the virtual space to a location that corresponds to a target location in the physical space may, for example, include moving one or more cameras within the virtual space such that the object of interest in virtual space moves to a location that corresponds to the target location in the physical space.

Figure 6B:
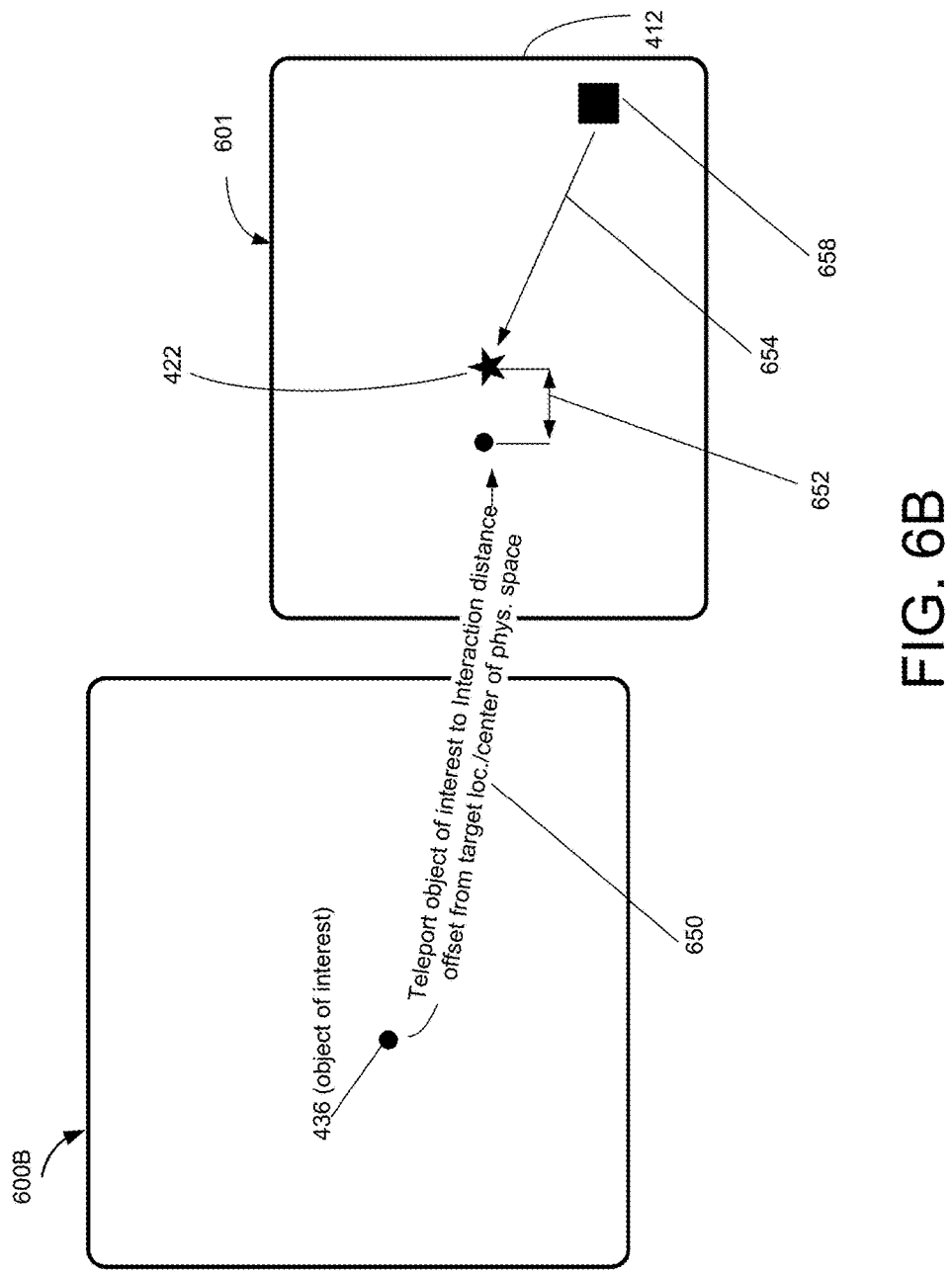
FIG. 6B is a diagram illustrating a virtual scene in a virtual space and a physical space according to an example embodiment in which an object of interest is teleported to a location that is at an interaction distance offset from a target location in the physical space according to an example embodiment.

FIG. 6B is a diagram illustrating a virtual scene in a virtual space 600A and a physical space 601 according to an example embodiment in which an object of interest is teleported to a location that is at an interaction distance offset from a target location in the physical space according to an example embodiment. An interaction distance (or interaction distance offset), for example, may be a distance that a user may typically space himself (or his character in the virtual space) from the object of interest to allow the user to interact with the object of interest. An interaction distance may be dependent on the game or activity that is being performed by the user, since different applications, games or activities may typically involve different interaction distances. As shown in FIG. 6B, an interaction distance offset 652 is shown for a golf ball 436 of a virtual golf game, by way of illustrative example. For example, an interaction distance of 12-18 inches may, for example, be used for a user to swing a golf club to hit a golf ball. Similarly, an interaction distance of 5 feet, with respect to an enemy character in a sword fight game, may be used by a user to engage in a sword fight with the enemy character. Thus, to cause a user to likely end up at the target location or approximate target location in the physical space, an object of interest may advantageously be moved to a location that corresponds to an interaction distance offset from the target location in the physical space 601. Also, in an example, the location of the object of interest may be provided opposite of a current location of the user, e.g., to cause the user 658 to walk (via line 654) to the target location 422 of the physical space 601.

FIG. 7 is a diagram illustrating a physical space that includes objects, where a target location of a walkable area of the physical space is indicated, according to an example embodiment. The target location 722 may include, by way of illustrative example, an approximate center or a center of the physical space 701. As shown in FIG. 7, a physical space 701 (e.g., room) may include boundaries due to walls and due to objects 720 (e.g., couches, tables, chairs, . . . ). Due to an irregular shape of the physical space 701/room and/or due to one or more objects within the physical space 701, it may be advantageous to identify a target location 722 (e.g., approximate center) of a walkable area of the physical space. For example, at least a portion of the physical space 701 is not walkable due to the objects 720 present in the room.

Thus, the target location (e.g., approximate center) 722 may be offset or moved downwards to reflect that the upper portion of the room/physical space is not walkable. Thus, rather than using an absolute or actual target location of a room/physical space, a target location of a walkable area of the room may be used instead, e.g., as a reference point or target to move an object of interest, according to an example embodiment.

Example 14

Figure 8:
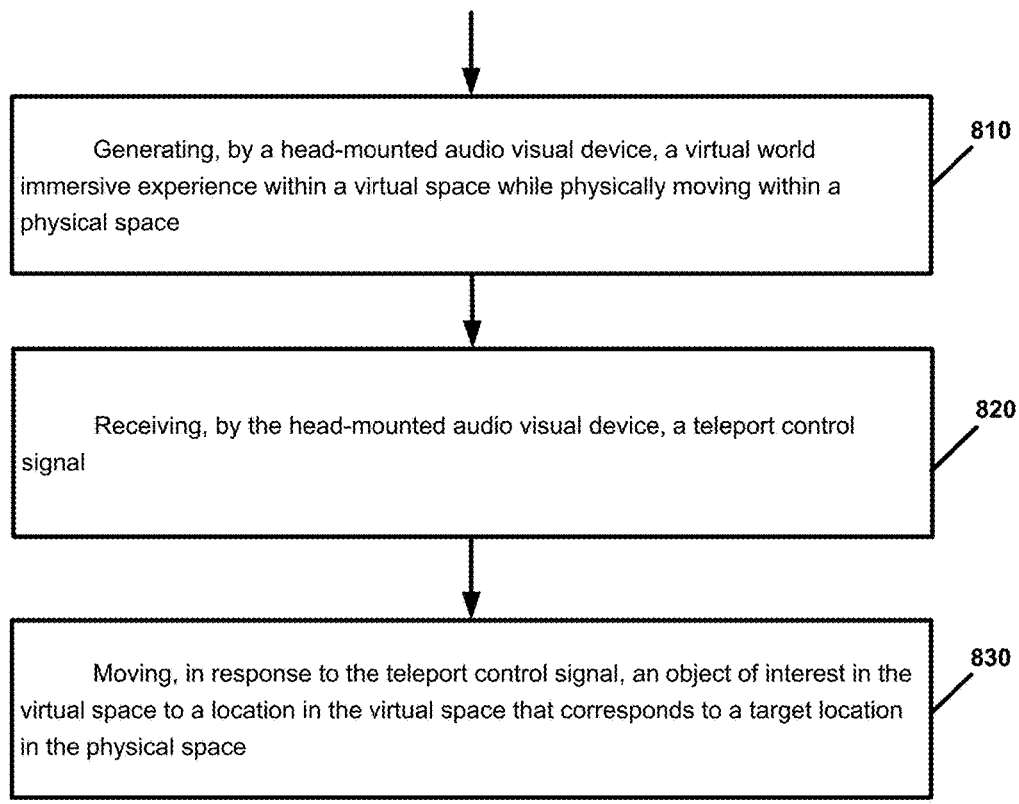
FIG. 8 is a flow chart illustrating operation of a head-mounted audio visual device according to another example embodiment.

FIG. 8 is a flow chart illustrating operation of a head-mounted audio visual device according to another example embodiment. Operation 810 includes generating, by a head-mounted audio visual device, a virtual world immersive experience within a virtual space while physically moving within a physical space. Operation 820 includes receiving, by the head-mounted audio visual device, a teleport control signal (e.g., requesting that a user, a user VR headset, a head-mounted audio visual device, or other object be moved to a selected location in the virtual space, or be moved from a first location within the virtual space to a second location within the virtual space). And, operation 830 includes moving, in response to the teleport control signal, an object of interest in the virtual space to a location in the virtual space that corresponds to a target location in the physical space.

Example 15

According to an example embodiment of the method of example 14, the moving may include moving, in response to the teleport control signal, an object of interest in the virtual space to a location in the virtual space that corresponds to an approximate center of the physical space. This has the advantage and effect that a movement of a user in the physical space is towards the center of the room when approaching the object of interest in the virtual space by corresponding movement in the physical space. For example, in a room with limited physical extent, it can be achieved that the physical limitations of the room do not unduly restrict possible interaction and/or movement of the user in the virtual space around the object by corresponding movements in the physical space. This is because the physical location corresponding to the object of interest, which may, e.g., be the center of the room, is selected, for example, in view of the physical extent of the room and possible and/or expected movement of the user around the object of interest.

Example 16

According to an example embodiment of the method of any of examples 14-15, the approximate center of the physical space may include at least one of the following: a center of the physical space; any point within a threshold distance of the center of the physical space; a center of a walkable area of the physical space; and an interaction distance offset from the center of the physical space.

Example 17

According to an example embodiment of the method of any of examples 14-16, the moving may include shifting, in response to the teleport control signal, the virtual space with respect to the physical space so that the object of interest is displayed at a location in the virtual space that corresponds to the target location in the physical space.

Example 18

According to an example embodiment of the method of any of examples 14-17, the moving may include moving, in response to the teleport control signal, an object of interest in the virtual space to a location in the virtual space that is an interaction distance offset from the target location in the physical space.

Example 19

According to an example embodiment of the method of any of examples 14-18, the method may further include detecting, by the head-mounted audio visual device, that the head-mounted audio visual device has moved to a location within a threshold distance of the target location in the physical space so that a user of the head-mounted audio visual device may interact with the object of interest at the interaction distance.

Example 20

According to an example embodiment of the method of any of examples 14-19, the moving may include shifting, in response to the teleport control signal, the virtual space with respect to the physical space so that the object of interest is provided at a location in the physical space that is an interaction distance offset from the target location in the physical space.

Example 21

According to an example embodiment of the method of any of examples 14-20, the moving may include shifting, in response to the teleport control signal, the virtual space with respect to the physical space so that the object of interest is provided at a location in the physical space that is an interaction distance offset from a target location of a walkable area of the physical space.

Example 22

An apparatus comprising at least one processor and at least one memory including computer instructions, when executed by the at least one processor, cause the apparatus to: generate, by a head-mounted audio visual device, a virtual world immersive experience within a virtual space while physically moving within a physical space; receive, by the head-mounted audio visual device, a teleport control signal; and move, in response to the teleport control signal, an object of interest in the virtual space to a location in the virtual space that corresponds to a target location in the physical space.

Example 23

A non-transitory computer-readable storage medium storing instructions that, when executed, cause a computing device to perform a method of any of examples 14-21.

Example 24

An apparatus includes means for performing the method of any of examples 14-21.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Figure 9:
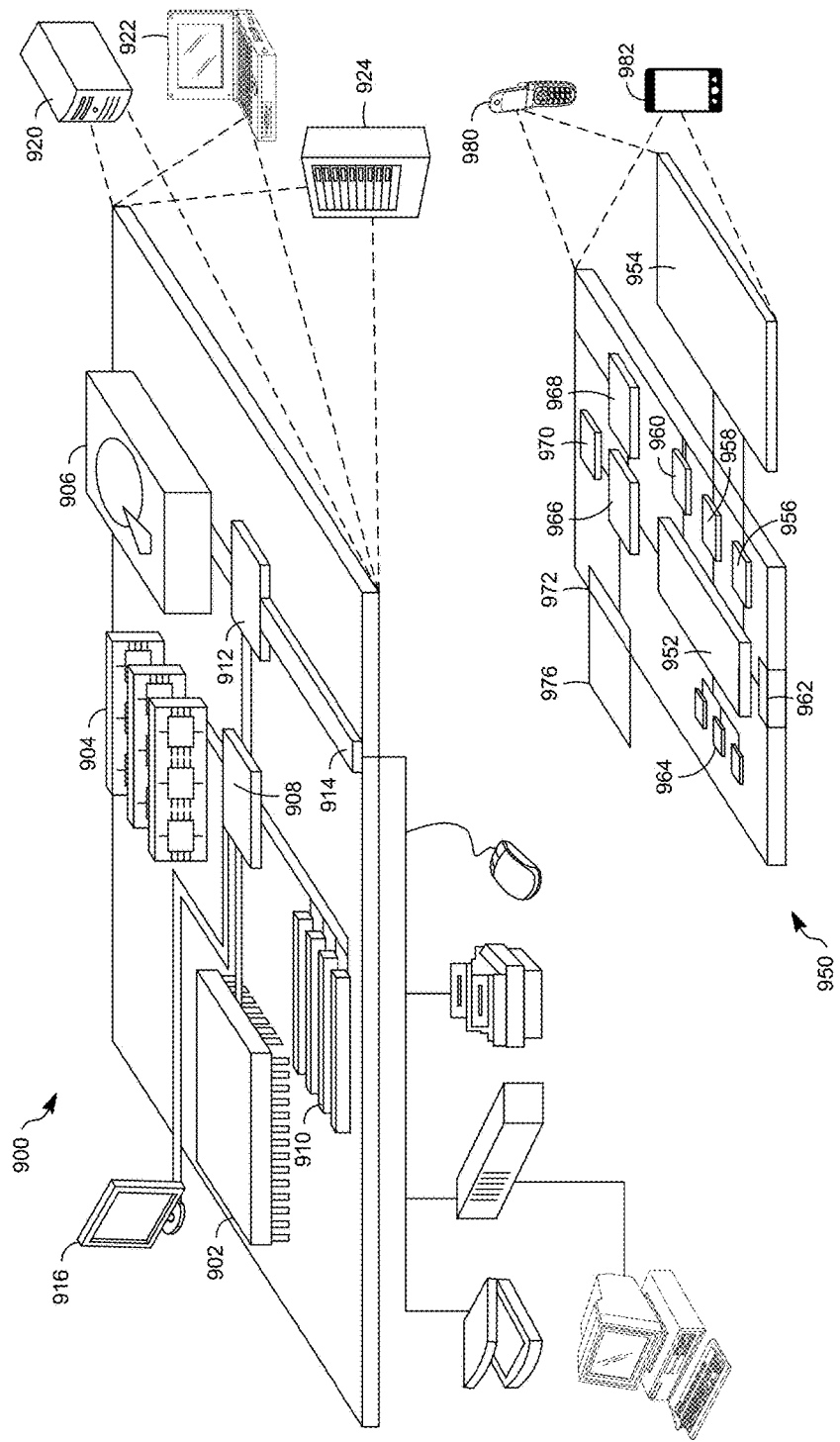
FIG. 9 illustrates an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only.

In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, various modifications may be made without departing from the spirit and scope of embodiments as broadly described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    generating, by a head-mounted audio visual device, a virtual world immersive experience within a virtual space while physically moving within a physical space;
    selecting, by the head-mounted audio visual device, a center or approximate center of the physical space as a target location within the physical space based on determining an approximate center location of a walkable area of the physical space, wherein the selecting the target location does not use a user-placed physical marker;
    displaying, by the head-mounted audio visual device within the virtual space, a visual target marker indicating the target location in the physical space;
    receiving, by the head-mounted audio visual device, a teleport control signal; and
    moving a virtual location of the head-mounted audio visual device within the virtual space from a first virtual location to a second virtual location in response to receiving the teleport control signal.

2. The method of claim 1 wherein the displaying comprises:
    displaying, by the head-mounted audio visual device within the virtual space, a visual target marker indicating a center of the physical space.

3. The method of claim 1 wherein the displaying comprises displaying, by the head-mounted audio visual device within the virtual space, a visual target marker indicating a target location in the physical space in response to at least one of the following:
    detecting that the head-mounted audio visual device is within a threshold distance of a boundary of the physical space;
    detecting that the head-mounted audio visual device has been re-oriented towards the target location in the physical space; and
    receiving either the teleport control signal or a signal from a controller to place the head-mounted audio visual device in a teleport mode.

4. The method of claim 1 wherein the displaying comprises:
    continuing displaying the visual target marker until the head-mounted audio visual device is within a threshold distance of the target location in the physical space.

5. The method of claim 1 wherein the displaying comprises:
    continuing displaying the visual target marker while the head-mounted audio visual device is within a walkable path within the physical space towards the target location or the visual target marker.

6. The method of claim 1 wherein the displaying comprises:

detecting that the head-mounted audio visual device is within a threshold distance of a boundary of the physical space;
performing the following in response to the detecting:
displaying, by the head-mounted audio visual device within the virtual space, a visual target marker indicating a target location in the physical space; and
displaying, by the head-mounted audio visual device within the virtual space, a visual boundary indicating the boundary of the physical space.

7. The method of claim 1 wherein the displaying comprises:
performing the following in response to the receiving the teleport control signal:
displaying, by the head-mounted audio visual device within the virtual space, the visual target marker indicating a target location in the physical space; and
displaying, by the head-mounted audio visual device within the virtual space, a visual boundary indicating the boundary of the physical space.

8. The method of claim 1 wherein the moving comprises:
moving a virtual location of the head-mounted audio visual device within the virtual space from a first virtual location to an object of interest within the virtual space.

9. The method of claim 1 and further comprising:
estimating, by the head-mounted audio visual device, that the head-mounted audio visual device will collide with a boundary of the physical space in less than a threshold period of time; and
displaying, by the head-mounted audio visual device within the virtual space, a visual boundary indicating the boundary of the physical space in response to the estimating.

10. The method of claim 1 and further comprising:
displaying, by the head-mounted audio visual device within the virtual space, a visual boundary indicating the boundary of the physical space at least a threshold period of time before the head-mounted audio visual device is estimated to collide with the boundary of the physical space.

11. An apparatus comprising at least one processor and at least one memory including computer instructions that, when executed by the at least one processor, cause the apparatus to:
generate, by a head-mounted audio visual device, a virtual world immersive experience within a virtual space while physically moving within a physical space;
select, by the head-mounted audio visual device without using a user-placed physical marker, a center or approximate center of the physical space as a target location within the physical space by determining an approximate center location of a walkable area of the physical space;
display, by the head-mounted audio visual device within the virtual space, a visual target marker indicating the target location in the physical space;
receive, by the head-mounted audio visual device, a teleport control signal; and
move a virtual location of the head-mounted audio visual device within the virtual space from a first virtual location to a second virtual location in response to receiving the teleport control signal.

12. A method, comprising:
generating, by a head-mounted audio visual device, a virtual world immersive experience within a virtual space while physically moving within a physical space;
determining, by the head-mounted audio-visual device, an approximate center location of a walkable area of the physical space;
selecting, by the head-mounted audio-visual device without using a user-placed physical marker, the approximate center location as a target location within the physical space;
receiving, by the head-mounted audio visual device, a teleport control signal; and
moving, in response to the teleport control signal, the head-mounted audio visual device from a first virtual location to a second virtual location in the virtual space.

13. The method of claim 12 wherein the moving comprises:
moving, in response to the teleport control signal, the head-mounted audio visual device to a location in the virtual space that corresponds to an approximate center of the physical space.

14. The method of claim 13 wherein the approximate center of the physical space comprises at least one of the following:
a center of the physical space;
any point within a threshold distance of the center of the physical space;
a center of a walkable area of the physical space; and
an interaction distance offset from the center of the physical space.

15. The method of claim 12 wherein the moving further comprises:
shifting, in response to the teleport control signal, the virtual space with respect to the physical space so that an object of interest is displayed at a location in the virtual space that corresponds to a target location in the physical space.

16. The method of claim 12 wherein the moving further comprises:
moving, in response to the teleport control signal, an object of interest in the virtual space to a location in the virtual space that is an interaction distance offset from a target location in the physical space.

17. The method of claim 12 further comprising:
detecting, by the head-mounted audio visual device, that the head-mounted audio visual device has moved to a location within a threshold distance of the target location in the physical space so that a user of the head-mounted audio visual device may interact with an object of interest at an interaction distance.

18. The method of claim 12 wherein the moving comprises:
shifting, in response to the teleport control signal, the virtual space with respect to the physical space so that an object of interest is provided at a location in the physical space that is an interaction distance offset from the target location in the physical space.

19. The method of claim 12 wherein the moving comprises:
shifting, in response to the teleport control signal, the virtual space with respect to the physical space so that an object of interest is provided at a location in the physical space that is an interaction distance offset from a target location of a walkable area of the physical space.

20. An apparatus comprising at least one processor and at least one memory including computer instructions that, when executed by the at least one processor, cause the apparatus to:

generate, by a head-mounted audio visual device, a virtual world immersive experience within a virtual space while physically moving within a physical space;

scan the physical space to identify a configuration of the physical space;

determine a center or approximate center of a walkable area of the physical space from the scan of the physical space;

select, by the head-mounted audio visual device without using a user-placed physical marker, the center or approximate center as a target location within the physical space;

display, by the head-mounted audio visual device within the virtual space, a visual target marker indicating the target location in the physical space;

receive, by the head-mounted audio visual device, a teleport control signal; and move, in response to the teleport control signal, an object of interest in the virtual space to a location in the virtual space that corresponds to the target location in the physical space.

\* \* \* \* \*